(12) United States Patent
Snoeren et al.

(10) Patent No.: US 9,678,222 B2
(45) Date of Patent: Jun. 13, 2017

(54) REDUCING TRAP EFFECTS IN A SCINTILLATOR BY APPLICATION OF SECONDARY RADIATION

(75) Inventors: Rudolph M. Snoeren, Eindhoven (NL); Heidrun Steinhauser, Eindhoven (NL); Nicolaas J. Noordhoek, Eindhoven (NL); Matthias Simon, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1913 days.

(21) Appl. No.: 12/594,958

(22) PCT Filed: Apr. 8, 2008

(86) PCT No.: PCT/IB2008/051329
§ 371 (c)(1),
(2), (4) Date: Mar. 2, 2010

(87) PCT Pub. No.: WO2008/126009
PCT Pub. Date: Oct. 23, 2008

(65) Prior Publication Data
US 2010/0140484 A1    Jun. 10, 2010

(30) Foreign Application Priority Data
Apr. 12, 2007  (EP) .................................. 07106050

(51) Int. Cl.
*G01T 1/20*        (2006.01)

(52) U.S. Cl.
CPC .............. *G01T 1/2018* (2013.01); *G01T 1/20* (2013.01)

(58) Field of Classification Search
CPC ................................. G01T 1/2018; G01T 1/20
USPC ......................................... 250/252.1, 363.01
See application file for complete search history.

(56) References Cited

U.S. PATENT DOCUMENTS

| 5,025,462 A | 6/1991 | Saito et al. | |
| 6,965,111 B2 * | 11/2005 | Endo | 250/370.11 |
| 7,196,334 B2 * | 3/2007 | Simon et al. | 250/370.14 |
| 2005/0230629 A1 * | 10/2005 | Watanabe et al. | 250/370.01 |

FOREIGN PATENT DOCUMENTS

| DE | 19914217 A1 | 10/2000 |
| DE | 10247985 A1 | 4/2004 |
| EP | 0642264 A1 | 3/1995 |

* cited by examiner

*Primary Examiner* — David Porta
*Assistant Examiner* — Carolyn Igyarto

(57) ABSTRACT

A radiation detector device for detecting a primary radiation includes a scintillator which generates a converted primary radiation in response to incoming primary radiation and a photo detector for detecting the converted primary radiation. The radiation detector device further includes a secondary radiation source for irradiating the scintillator with a secondary radiation which has a wavelength different from a wavelength of the first radiation and which is capable of producing a spatially more uniform response of the scintillator to primary radiation.

18 Claims, 5 Drawing Sheets

REDUCING TRAP EFFECTS IN A SCINTILLATOR BY APPLICATION OF SECONDARY RADIATION

FIELD OF THE INVENTION

The invention relates to the field of radiation detectors, and more specifically to a radiation detector which comprises a scintillator.

BACKGROUND OF THE INVENTION

EP 0 642 264 A1 discloses an image detection device having a semiconductor image detection array for detecting X-ray images wherein perturbations due to phantom images are substantially mitigated. According to this reference, delayed charge transfer due to trapping of charges in the semiconductor material of radiation sensor elements causes such perturbations. The detection device according to the reference comprises an image detection array which incorporates radiation sensitive elements to convert incident radiation into charges, and read-out-lines to transfer the charges to a read-out circuit which is arranged to convert transferred charges into a primary electronic image signal. The detection device further comprises a correction circuit to form an image correction signal for converting the primary electronic image signal into a corrected image signal by removing artifacts due to delayed charge transfer from the primary electronic image signal. The image correction signal may be assembled as superposition of exponentially decaying signals of images which were detected before the detection of a currently detected image. A corrected image signal is subsequently assembled from the image correction signal and the image signal containing artefacts.

SUMMARY OF THE INVENTION

It would be advantageous to achieve a radiation detector device which overcomes the problem of phantom images and provides a uniform spatial gain distribution.

To better address this concern, in a first aspect of the invention a radiation detector device for a primary radiation is presented which comprises a scintillator which generates a converted primary radiation in response to incoming primary radiation and a photo detector for detecting the converted primary radiation. The radiation detector device further comprises a secondary radiation source for irradiating the scintillator with a secondary radiation wherein the secondary radiation has a wavelength different from a wavelength of the first radiation and produces a spatially more uniform response of the scintillator to primary radiation. According to an embodiment, the secondary radiation is capable of reducing trap induced effects in the scintillator. Mechanisms for reducing trap induced effects may include filling the traps by irradiation of the scintillator with the secondary radiation and/or saturating the traps by irradiation of the scintillator with the secondary radiation.

An advantage of the first aspect of the invention is that memory effects of the scintillator, e.g. a spatial non-uniform response of the scintillator due to a previous image acquisition, can be eliminated or at least reduced without the necessity to irradiate the scintillator with the primary radiation. According to an embodiment, trap induced effects of the scintillator are eliminated or at least reduced by the irradiation of the scintillator with the secondary radiation.

According to an embodiment, the wavelength of the secondary radiation is longer than the wavelength of the primary radiation. For example, the wavelength of the secondary radiation may be non-ionizing radiation, e.g. radiation having a wavelength greater than 200 nm. According to another embodiment, the wavelength of the secondary radiation is longer than 300 nm. According to another embodiment, the secondary radiation is UV light. According to still another embodiment, the secondary radiation is blue light. According to still another embodiment, the wavelength of the secondary radiation is within the range of 350 nm to 450 nm.

According to still another embodiment, the secondary radiation source comprises one or more light emitting diodes (LED) capable of emitting the secondary radiation.

According to an embodiment, the primary radiation is an X-ray radiation. According to other embodiments, the primary radiation is non X-ray radiation. According to an embodiment, the primary radiation is an ionizing radiation, e.g. neutron radiation. According to still another embodiment, the primary radiation is a radiation having a wavelength shorter than 100 nm.

According to still another embodiment, the detector device further comprises a control unit configured to operate the secondary radiation source in response to a non-activation signal indicating absence of primary radiation.

According to still another embodiment, the radiation detector device further comprises a control unit configured to operate the secondary radiation source in a continuous mode over a time period sufficiently long to saturate the traps in the scintillator. According to an embodiment, the intensity the second radiation is such that the traps in the scintillator are saturated within a predetermined period of time.

According to still another embodiment, the radiation detector device further comprises a control unit configured to operate the secondary radiation source in a pulsed mode.

According to still another embodiment, the radiation detector device further includes a tertiary radiation source operable to produce tertiary radiation which is suitable for filling traps in the photo detector which e.g. may have been induced by primary radiation.

According to a second aspect of the invention, an imaging apparatus is presented which comprises a radiation detector device according to the first aspect of the invention or an embodiment thereof. Further, the imaging apparatus according to the second aspect of the invention comprises a primary radiation source for generating the primary radiation.

An example of such an imaging apparatus is an X-ray imaging apparatus, wherein the primary radiation is X-ray radiation. However, the primary radiation source may be a non-X-ray radiation source.

According to still another embodiment of the invention, an imaging apparatus is presented, which further comprises a control unit configured for preventing activation of the secondary radiation source when an imaging process is not performed. According to still another embodiment of the invention, an imaging apparatus is presented, which further comprises a control unit configured for preventing activation of the secondary radiation source when the primary radiation source is activated. Additionally or alternatively, the control unit may be configured for preventing activation of the secondary radiation source when the read-out of the detector is activated. An advantage thereof is that the secondary radiation source does not interfere the normal detector operation, i.e. the detection of primary radiation e.g. during an image acquisition. According to an embodiment, a non-activation signal may be provided to the control unit, wherein the non-activation signal indicates that an imaging process involving primary radiation is not performed. According to another embodiment, a non-activation signal indicates a non-activation state of the primary radiation source. According to another embodiment, the non-activation signal indicates a non-activation state of the read-out of the detector. According to an embodiment, in response to the non-activation signal the control unit allows an activation of the secondary radiation source, e.g. a manual activation of the secondary radiation source or an automatic activation of the secondary radiation source. According to another embodiment, the control unit may be configured to automatically activate the secondary radiation sources in response to the non-activation signal.

According to an embodiment, an imaging apparatus is presented which further comprises a control unit which is configured for commanding (1.) an acquisition of an image sequence by respectively activating an imaging process involving primary radiation at least twice with a pause between two activations of said imaging process; and (2.) operating said secondary radiation source in said pause where said imaging process is not activated.

According to still another embodiment of the invention, an imaging apparatus is provided which further comprises a control unit which is configured for commanding an acquisition of an image sequence by respectively activating the primary radiation source at least twice with a pause between two activations of the primary radiation source. Further, the control unit may be configured to operate the secondary radiation source in the pause where the primary radiation source is not activated and/or in a non-activation state of the read-out of the detector.

According to a third aspect of the invention, a method of operating a radiation detector device for detecting primary radiation is presented, wherein the method comprises irradiating a scintillator with a secondary radiation having a wavelength different from a wavelength of the primary radiation to thereby produce a spatially more uniform response of the scintillator. According to an embodiment, the radiation detector device is a radiation detector device according to the first aspect of the invention or an embodiment thereof.

According to fourth aspect of the invention, a method of operating a control unit of a radiation detector device is presented, wherein the radiation detector device is a radiation detector device according to the first aspect of the invention or an embodiment thereof, wherein the method comprises generating control signals to command an activation of the secondary radiation source to produce a spatially more uniform response of the scintillator.

According to a fifth aspect of the invention, a computer program product is presented which enables a processor to carry out the method according the fourth aspect of the invention or an embodiment thereof. An advantage of such a computer program product is that a control unit for controlling the radiation detector device does not have to be exchanged, but can be reprogrammed by the respective computer program product. The computer program product according to the respective embodiment of the invention may be provided in any suitable form, e.g. in the form of a new release of computer program, or in the form of an update for an existing computer program. The computer program product may be provided via a respective medium, e.g. on a removable medium, over the internet, etc.

Other embodiments of the invention include a combination of at least two of the above described embodiments.

In summary, according to an embodiment of the invention, a radiation detector device for detecting a primary radiation comprises a scintillator which generates a converted primary radiation in response to incoming primary radiation and a photo detector for detecting the converted primary radiation. The radiation detector device further comprises a secondary radiation source for irradiating the scintillator with a secondary radiation which has a wavelength different from a wavelength of the first radiation and which is capable of producing a spatially more uniform response of the scintillator. In an embodiment of the invention, the radiation detector device is an X-ray detector of an X-ray imaging apparatus where the primary radiation is X-ray radiation and the secondary radiation has a wavelength between 350 nm and 450 nm. According to an embodiment, the irradiation with the secondary radiation, e.g. UV radiation, produces a uniform gain distribution of the X-ray detector.

These and other aspects of the invention will be apparent from and elucidated with reference to the embodiments described hereinafter.

BRIEF DESCRIPTION OF THE DRAWINGS

In the following detailed description, reference is made to the drawings in which.

DETAILED DESCRIPTION OF EMBODIMENTS

With reference to the drawings, illustrative embodiments of the present invention will now be described in more detail. Throughout the detailed description of the embodiments, an exemplary example for the primary radiation is X-ray radiation and an example for the secondary radiation non-X-ray radiation, and in particular, UV radiation or blue light.

Figure 1:
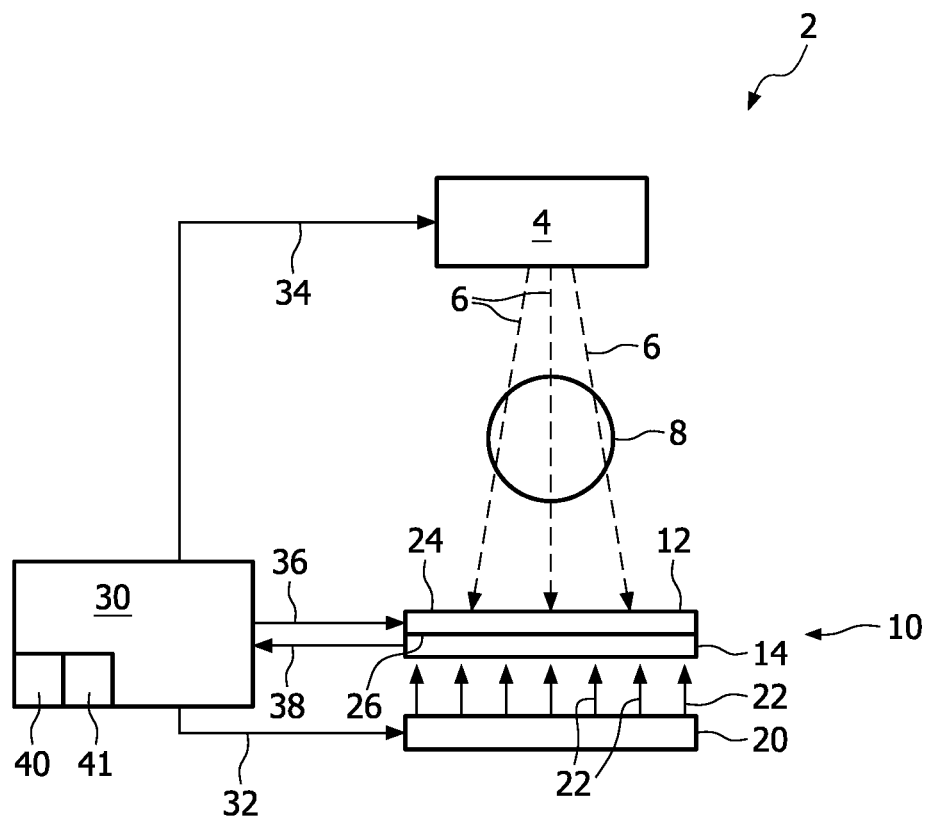
FIG. 1 shows a schematic view of an embodiment of an imaging apparatus according to the invention.

FIG. 1 shows a schematic view of an exemplary embodiment of an imaging apparatus 2. The imaging apparatus 2 comprises a primary radiation source 4 for irradiating an object 8 to be investigated with a primary radiation 6. The object 8 exemplarily shown in FIG. 1 may be a human being. However, the object 8 may also be an animal or any kind of substance. In the embodiment shown in FIG. 1, the primary radiation source 4 is an X-ray source and the primary radiation is X-ray radiation. However, the primary radiation may be any other radiation which is suitable for investigating the object 8.

After passing through the object 8, the primary radiation 6 is detected by a radiation detector device 10. The detector device 10 comprises a scintillator 12 and a photo detector 14. In response to incident primary radiation 6, the scintillator 12 generates a converted primary radiation 18. The photo detector 14 is provided for detecting the converted primary radiation 18 and producing in response hereto image signals representative of the converted primary radiation 18.

In the exemplary embodiment shown in FIG. 1, the scintillator is a CsI:Tl (Thallium doped Caesium Iodide) type scintillator. However, the scintillator can be any scintillator suitable for the selected primary radiation 6. The photo detector 14 employed in the imaging apparatus 2 shown in FIG. 1 is a flat dynamic X-ray detector (FDXD) which comprises a plurality of photo diodes 16 for detecting the converted primary radiation 18 as shown in greater detail in FIG. 2.

The scintillator type CsI:Tl, which is commonly used in flat panel X-ray detectors, exhibits a temporal gain effect, hence forth called "bright-burn". This gain effect depends on the information content of the projection image: Due to trapping of charge carriers, the gain of the scintillator 12 and hence of the detector device 10 may be dependent on the history in time, space and intensity. Upon high irradiation, a gain image is imprinted on the scintillator 12 and is imposed on the images gathered subsequently. In case of low contrast imaging, this image will shine through for longer periods of time (days). In particular in soft tissue imaging, like a CT type of imaging, these imprinted contrasts will show as rings in the reconstructed image. The effects are undesirable, since they reduce low contrast visibility of tissue. As already stated above, an embodiment of the invention deals with annihilation of the effect.

The gain dependence on the applied dose can amount up to 6% from zero exposure up to saturation, depending on the Tl content. In practice, after a digital subtraction angiography (DSA), values of around 1% will be found, which is too high for soft tissue imaging where contrasts of the same order of magnitude must be detected.

In order to enhance the low contrast visibility, the embodiment of a radiation detector device 10 shown in FIG. 1 comprises a secondary radiation source 20 for applying to the scintillator a secondary radiation 22, which is adapted for generating a spatially more uniform gain distribution of the scintillator 12 for the primary radiation 6, i.e. for the X-rays in the present embodiment. Since the secondary radiation source 22 is positioned on a side opposite the X-ray source 4, i.e. on the back of the radiation detector device 10, a detector device 10 of this type is herein called back lit Flat Dynamic X-ray Detector (FDXD). In particular "back-lit" refers to irradiating the photo-diodes and/or the scintillation layer through the substrate supporting these photo-diodes and the scintillation layer. The substrate may be formed of glass for this purpose.

Experiments have shown that light in the wavelength range between 350 nm and 450 nm or, for example, between 365 nm and 400 nm or, for example, between 370 and 390 nm, or, for example, at 380 nm is suitable for producing a spatially more uniform response of the scintillator to X-ray radiation. This has the advantage that a uniform gain distribution of the detector can be obtained without flooding the detector with X-rays. Using secondary radiation in the form of UV radiation or in the form of blue light, making the scintillator have a uniform gain distribution is not accompanied with a radiation exposure of the personnel or the patient.

Figure 2:
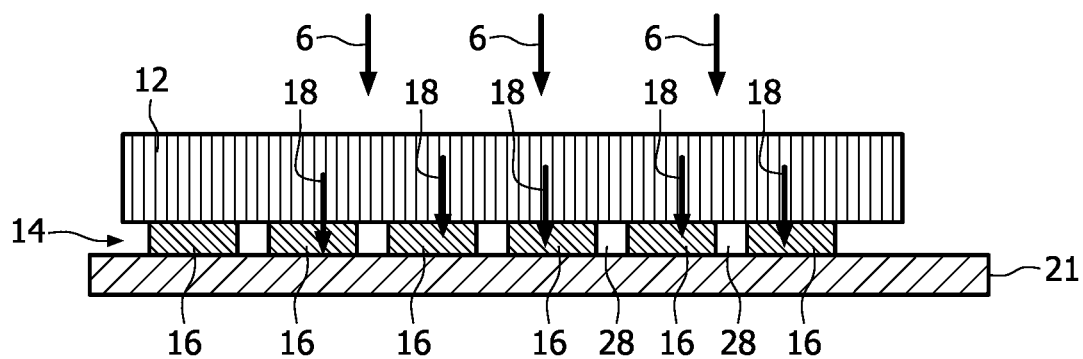
FIG. 2 shows a cross-sectional partial view of an embodiment of a radiation detector device according to the invention.

In the embodiment of FIG. 1 and FIG. 2, the secondary radiation source 20 is mounted beneath a substrate 21. Over the substrate 21, the photo detector 14 is formed. Over the photo detector 14, the scintillator 12 of the detector device 10 is formed. Accordingly, the secondary radiation source 20 is mounted facing a second surface portion 26 of scintillator 12 which is opposite to a first surface portion 24 of the scintillator 12 facing the primary radiation source 4. Therefore, in the illustrated embodiment, the radiation path of the primary radiation extends between the primary radiation source 4 and the first surface portion 24 and the radiation path of the secondary radiation 22 extends between the secondary radiation source 20 and the second surface portion 26.

Figure 3:
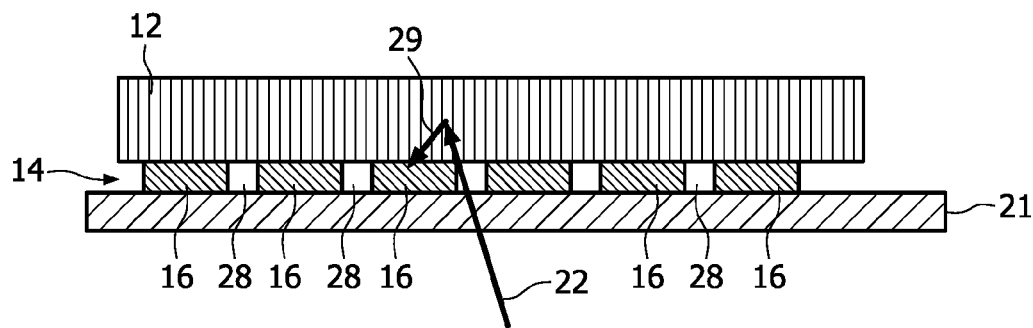
FIG. 3 shows a cross-sectional partial view of another embodiment of a radiation detector device according to the invention.

FIG. 3 shows the elements of FIG. 2 in a different operating state. While FIG. 2 shows the scintillator 12, the photo detector 14 and the substrate 21 during acquiring a primary radiation image, i.e. during irradiation of the scintillator 12 with primary radiation 6, FIG. 3 shows the scintillator 12, the photo detector 14 and the substrate 21 during the irradiation of the scintillator 12 with the secondary radiation 22.

FIG. 3 shows an exemplary radiation path of the secondary radiation 22 in the detector device 10 of FIG. 2. The secondary radiation 22 passes through the transparent parts of the substrate 21 passes by the photo diodes 16 and reaches the scintillator 12. Passing secondary radiation 22 through the photo detector 14 may include passing secondary radiation past photo diodes 16 through a space 28 between the photo diodes 16, wherein the space 28 is transparent to the second radiation 22. In the depicted embodiment, the back side of the photo diodes 16 is not transparent to the secondary radiation 22, i.e. to light. Alternatively, the photo diodes 16 may be transparent for the secondary radiation 22.

The secondary radiation 22 reaching the scintillator 12 fills traps generated by previous image acquisitions with primary radiation 6. According to an embodiment, the traps are saturated by irradiation of the scintillator 12 with the secondary radiation 22. Due to the resulting homogeneous spatial gain distribution of the scintillator 12, a calibration which would account for an inhomogeneous gain distribution is not necessary.

According to an embodiment of the invention, fluorescence 29 generated by the excited scintillator 12 in response to the secondary radiation 22 is used for trap filling of the photo detector 14. In another embodiment, the photo-diodes may also have a direct responsivity to UV light and thus may also be subject to trap-filling. For example, the fluorescence 29 of the excited scintillator can be used for filling traps of the photo diodes 16 in the embodiment of an imaging apparatus 2 shown in FIG. 1, thereby reducing a gain effect, and in particular trap induced gain variations among the photo diodes. FIG. 1 shows an exemplary embodiment of a control unit 30 of an imaging apparatus according to an embodiment of the invention. The imaging apparatus 2 of FIG. 1 is controlled by the control unit 30. In particular, the control unit 30 is configured to control the secondary radiation source 20. To this end, the control unit 30 provides control signals 32 to the secondary radiation source 20 for making the secondary radiation source 20 emit the secondary radiation 22.

The control unit 30 further provides control signals 34 to the primary radiation source 4 for making the primary radiation source 4 emit the primary radiation 6. Generally, the control unit may be configured for activating the secondary radiation source 20 when an imaging process is not activated. According to an embodiment, the control unit may be configured for activating the secondary radiation source 20 when the primary radiation source 4 is not activated or when the read-out of the detector 14 is not activated. For example, with regard to a non-activation an imaging process, e.g. a non-activation of the primary radiation source 4 or a non-activation of the read-out of the detector 14, the control unit 30 may generate a non-activation signal, indicating that the primary radiation source 4 or the read-out of the detector 14 is not activated. The control unit 30 or a control device thereof may be configured to operate the secondary radiation source 20 in response the non-activation signal. Such a configuration of the control unit 30 has the advantage that the secondary radiation source 20 is not activated during image acquisition, where the primary radiation source 4 is activated to generate primary radiation.

The secondary radiation source 20 may be automatically activated after an imaging an object 8 yielding a high contrast in the primary radiation image, since such a high contrast may lead to the initially described bright-burn effect and hence to a spatially non-uniform response of the scintillator 12 after such high-contrast imaging. According to other embodiments, the secondary radiation source 20 may be automatically activated after each image acquisition or after each image sequence acquisition. Further, a user interface may be provided which allows a user to manually activate the secondary radiation source.

According to another embodiment, the control unit 30 is configured to command acquisition of an image sequence. Examples of an image sequence include, without being limited hereto, an image sequence taken in conjunction with a computer tomography run wherein a plurality of 2D images is acquired on the basis of which a 3D image of an object of interest is reconstructed, and an image sequence of low dose fluoroscopy images. An image sequence may require a considerable number of images and may be adversely affected by the bright-burn effect. In conjunction with the acquisition of an image sequence, the control unit 30 may be configured to activate the primary radiation source at least twice with a pause between two activations of the primary radiation source 4. Further the control unit 30 is configured for operating the secondary radiation source 20 in the pause where the primary radiation source 4 is not activated. This embodiment allows for keeping a gain distribution of the scintillator uniform during an acquisition of an image sequence. Hence the image quality may be enhanced without increasing the radiation dose of the primary radiation for the patient.

According to an embodiment, the exposure time during which the scintillator is irradiated with the secondary radiation is determined by the control unit in response to sensor signals and/or program settings. According to another embodiment, the exposure time is fixed. This embodiment may be employed when the secondary radiation does not adversely affect the scintillator, e.g. in terms of life time, etc. For example, when using a UV source as secondary radiation source, the exposure time may be fixed to a value that ensures a uniform response of the scintillator irrespective of its imaging history. Further, the exposure time may be dependent on the imaging mode. For example, for acquisition of a single image, the scintillator may be exposed to secondary radiation for a time sufficient to make the scintillator provide a uniform response. In contrast, for an acquisition of an image sequence, the scintillator may be exposed to secondary radiation in the pauses between the activation of the primary radiation source 4 only for a reduced time period. Further, in the pauses of an image sequence, the scintillator may be exposed to a relatively lower intensity of the secondary radiation compared to the intensity irradiated to the scintillator prior to a single image acquisition.

A fixed exposure time may be provided in various ways. For example, the exposure times of the scintillator to the secondary radiation may be fixed during manufacturing of the imaging device 2. According to another embodiment, the exposure times of the scintillator to the secondary radiation may be fixed during start-up of the imaging device 2. According to still another embodiment, the exposure times of the scintillator to the secondary radiation may be fixed by the user via a user interface prior to the imaging run.

Figure 10:
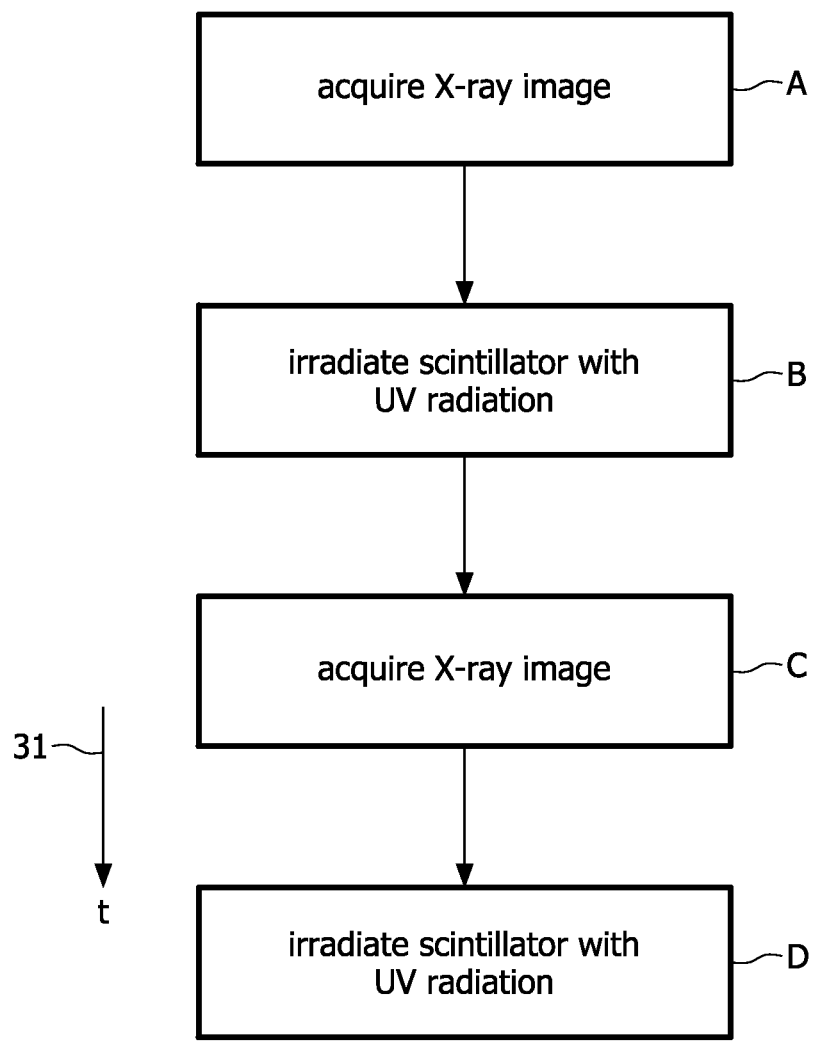
FIG. 10 shows a flow chart of method of operating an imaging apparatus according to an embodiment of the invention.

FIG. 10 illustrates an embodiment of a method of operating an imaging device. The sequence of method steps is performed subsequently in time t, indicated at 31 in FIG. 10. First (A), an x-ray image is acquired. Subsequently (B), the scintillator 20 is irradiated with secondary radiation. Thereafter (C), a further x-ray image is acquired, followed by an irradiation of the scintillator with secondary radiation (D). This sequence may be repeated one or more times. Further, the sequence may be terminated after two image acquisitions. Further, prior to the first image acquisition, an exposure of the scintillator to secondary radiation may be performed. In other embodiments, instead of one image, two or more images are acquired in A and C.

The control unit 30 further provides control signals 36 to the photo detector 14, e.g. for selecting one or more photo detector elements of the photo detector 14 for read-out.

Further, the control unit 30 receives image signals 38 from the photo detector 14. Image signals may be any signals which relate to an image acquired by the photo detector 14.

Further, the control unit 30 may be adapted to control other parts of the imaging apparatus 2. For example in a CT scanner of a C-arc Cardio-Vascular imaging apparatus, the primary radiation source 4 and the radiation detector device 10 are mounted on diametrically opposite sides of a C-shaped arc. As an example, in such an embodiment of an imaging apparatus 2, the control unit 30 may adapted for controlling driving motors of the C-arc (not shown).

It should be noted that according to another embodiment, the secondary radiation source may be operated to provide the secondary radiation 22 at a relatively low intensity wherein the secondary radiation 22 is adapted for generating an image of a spatial secondary gain distribution of the scintillator 12 for the secondary radiation 22 wherein this spatial secondary gain distribution image corresponds to a spatial primary gain distribution image of the scintillator 12 for the primary radiation 6, for the X-rays in the illustrated embodiment. This spatial secondary gain distribution image may be used to check the uniformity of the response of the scintillator to primary radiation. According to another embodiment, the spatial secondary gain distribution image may be used for a calibration of the detector device 10. It should be noted that equalizing the spatial gain distribution and acquisition of a spatial secondary gain distribution image may be performed with the same secondary radiation source, only by applying a relatively high intensity of secondary radiation to the scintillator for equalizing its response or by applying a relatively low intensity of secondary radiation to the scintillator for acquisition of the spatial secondary gain distribution image. Moreover, it should be understood that a lower intensity may be compensated with a longer exposure time and vice versa.

The control unit 30 may comprise one or more separate control devices 40 wherein each of the mentioned individual functions of the control unit 30 may be performed by one of the control devices 40. In other embodiments of the invention, the control unit may perform only part of the above mentioned individual functions. In still other embodiments of the invention, the control unit may perform further functions in addition to part or all of the above mentioned individual functions. According to other embodiments, the control unit (30) may include a memory 41 or may be connected to a memory for storing operating programs, operating parameters, user-defined set-points, automatically generated values, etc. Some or all of the individual functions of the control unit 30 may be performed in response to a predetermined program. Further, some or all of the individual functions of the control unit 30 may be performed in response to sensor signals or other external signals. Some or all of the individual functions of the control unit 30 may be performed by carrying out a respective computer program on a microprocessor. According to other embodiments, some or all of the individual functions of the control unit 30 may be performed by a discrete circuit. The control unit 30 or one or more of the control devices 40 of the control unit 30 may be part of a higher ranking control system.

FIG. 4 to FIG. 8 illustrate some of the possible embodiments of radiation detector devices. Some of these embodiments use a photo-luminescent sheet or a light emitting diode (LED) as a secondary radiation source. A photo-luminescent sheet may comprise an organic luminescence layer of a organic light emitting diode (OLED). However, other forms of secondary radiation sources are also possible in other embodiments of the invention, as long as they provide the appropriate secondary radiation for producing a spatially more uniform response of the scintillator 12 to the primary radiation. It is to be understood that in the case where the secondary radiation is UV radiation, the respective photo-luminescent sheet is a UV-luminescent sheet and the respective LED is a UV-LED, which emits radiation in the UV range. In the exemplary embodiments of FIG. 4 to FIG. 8, the photo detector 14 comprises a plurality of photo diodes 16. However, it is to be understood, that the photo detector may have any form suitable for detecting the radiation which is generated by the scintillator in response to the irradiation with the secondary radiation. Each of the embodiments of a radiation detector shown in FIG. 4 to FIG. 8 can replace the radiation detector 10 in FIG. 1. In this sense, features and advantages which have been stated with regard to the radiation detector 10 are not repeated for the embodiments of radiation detectors shown in FIG. 4 to FIG. 8.

When discussing advantages of the embodiments shown in FIG. 4 to FIG. 8, it is assumed that primary radiation 6 is irradiated from above onto the respective radiation detector device. However, this assumption has been made only for illustrative purposes and the embodiments are not restricted hereto.

Figure 4:
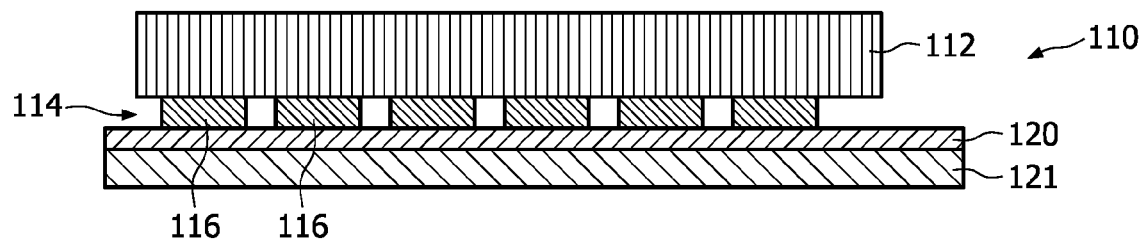
FIG. 4 shows a cross-sectional view of still another embodiment of a radiation detector device according to the invention.

FIG. 4 shows an embodiment of a radiation detector device 110 having a photo-luminescent sheet 120 formed over a substrate 121. Photo diodes 116 of the photo detector 114 are formed over the photo-luminescent sheet 120. Over the photo diodes 116, a scintillator 112 is formed. This embodiment has the advantage that the substrate 121 does not have to be transparent for the secondary radiation.

Figure 5:
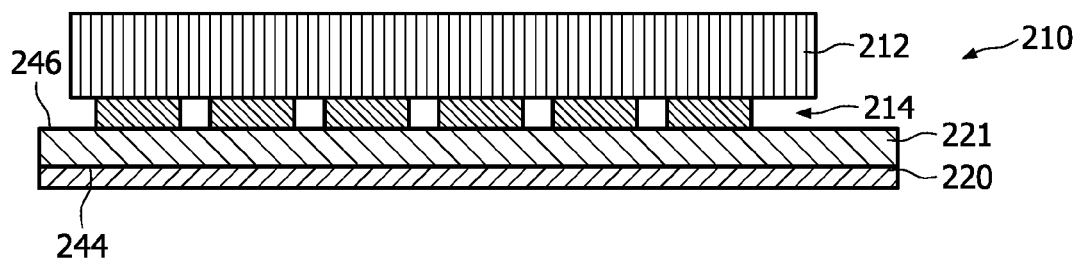
FIG. 5 shows a cross-sectional view of still another embodiment of a radiation detector device according to the invention.

FIG. 5 shows an embodiment of a radiation detector device 210 having a photo-luminescent sheet 220 formed on a surface 244 of a substrate 221. The surface 244 of the substrate 221 is opposite a surface 246, on which the photo detector 214 is formed. A scintillator 212 is formed over the photo detector 214. The substrate 221 can be chosen so as to be transparent for secondary radiation and non-transparent for primary radiation. Instead of such a "filtering substrate", a substrate which is transparent for the primary radiation and the secondary radiation can be provided with an appropriate radiation filter. In both cases, the irradiation of the photo-luminescent sheet 220 with primary radiation can be avoided.

Figure 6:
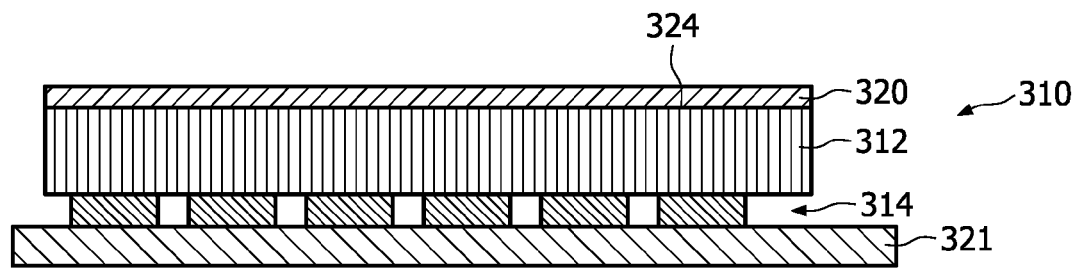
FIG. 6 shows a cross-sectional view of still another embodiment of a radiation detector device according to the invention.
Figure 7:
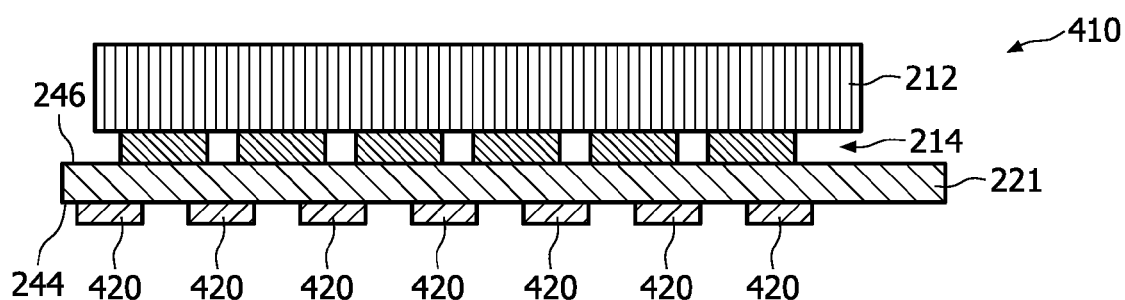
FIG. 7 shows a cross-sectional view of still another embodiment of a radiation detector device according to the invention.

FIG. 6 shows an embodiment of a radiation detector device 310 having a photo detector 314 formed over a substrate 321. Over the photo detector 314 a scintillator 312 is formed. Over the scintillator 312 a photo-luminescent sheet 320 is formed which transparent for primary radiation. The primary radiation 6 and the secondary radiation 22 are therefore irradiated onto a common surface portion 324 of the scintillator 12. FIG. 7 shows an embodiment of a radiation detector device 410 having the scintillator 212, the photo detector 214 and the substrate 221 of the embodiment of FIG. 5. However, compared to the embodiment of FIG. 5, the radiation detector 410 comprises a plurality of secondary radiation emitting diodes 420 instead of the photo-luminescent sheet 220 of the device 210 of FIG. 5. It should be noted that in any of the embodiments shown in FIG. 4 to FIG. 6 the respective photo-illumination sheet 120, 220, 320 can be replaced by a plurality of appropriate light emitting diodes.

Figure 8:
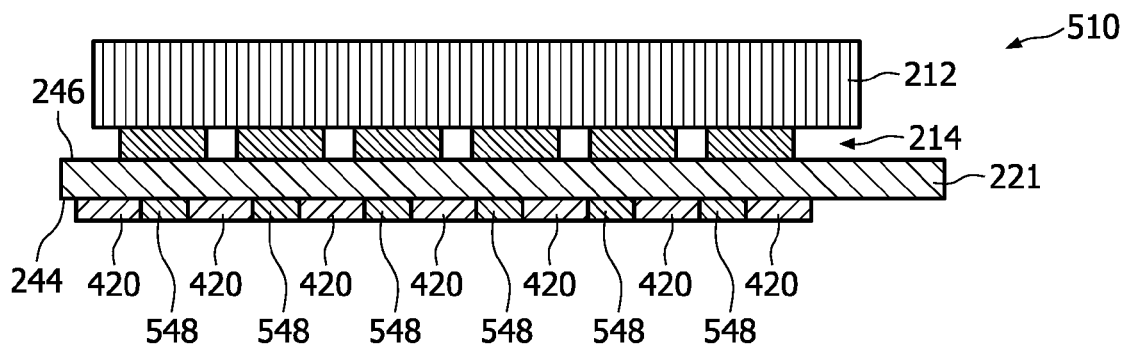
FIG. 8 shows a cross-sectional view of still another embodiment of a radiation detector device according to the invention.

FIG. 8 shows an embodiment of a radiation detector device 510 which corresponds to the radiation detector device 410 of FIG. 7, having in addition a plurality of tertiary radiation sources 548, light emitting diodes in the depicted embodiment, which can be operated to produce tertiary radiation which is suitable for filling traps induced by primary radiation in the photo detector 214. This embodiment has the advantage that after filling the traps in the photo detector 214 with tertiary radiation, the photo detector has a uniform sensitivity for acquisition of an image acquired by use of primary radiation. The tertiary radiation source may be red light. According to an embodiment, the tertiary radiation source 548 is activated and de-activated in accord with the activation and de-activation of the secondary radiation source 20. According to other embodiments, the tertiary radiation source 548 is activated and/or de-activated independently of the secondary radiation source.

Figure 9:
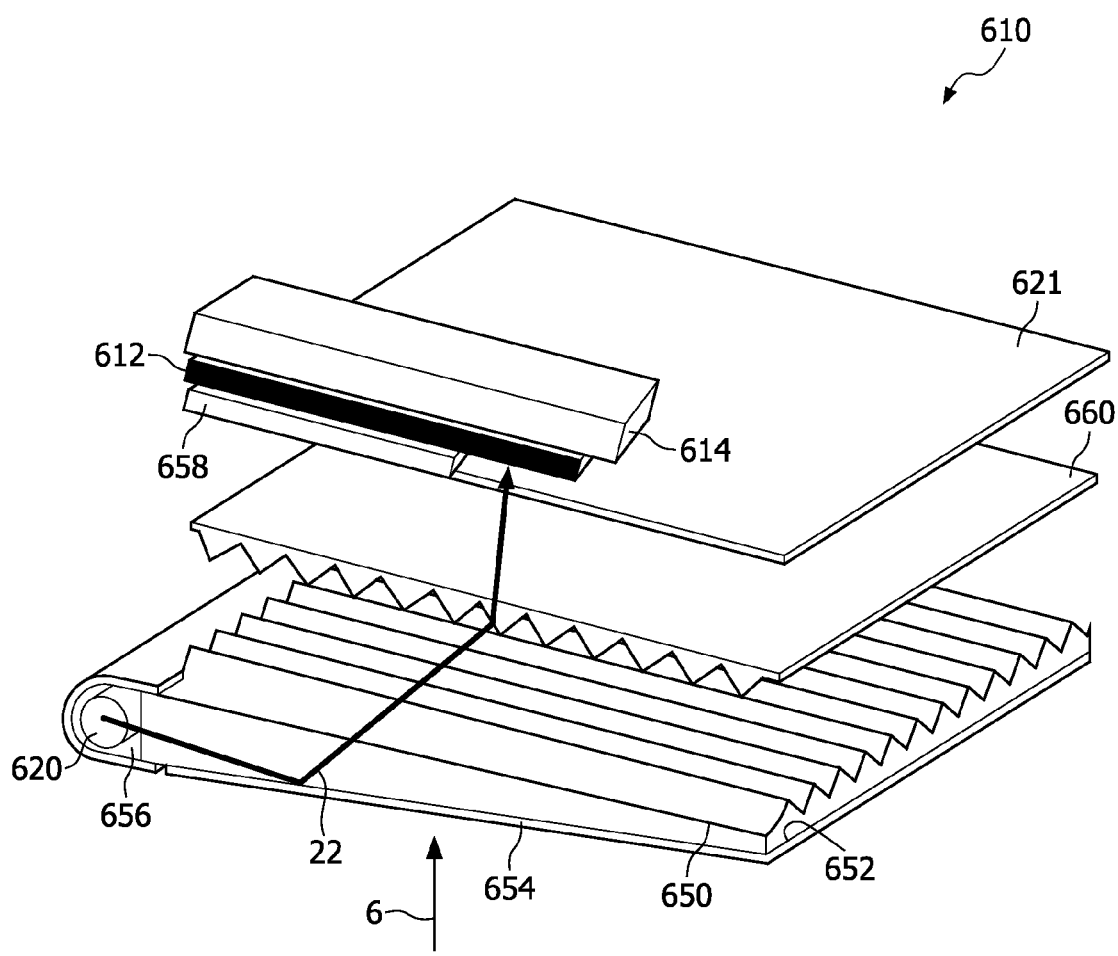
FIG. 9 shows an exploded perspective view of still another embodiment of a radiation detector according to the invention.

FIG. 9 shows an exploded view of a further embodiment of a radiation detector device 610 having a front-lit CMOS type photo detector 614.

The radiation detector device 610 has a LED array as a secondary radiation source 620. The secondary light source 620 is located outside of the beam of primary radiation 6. An advantage of this embodiment is that instead of an LED array 620, any other type of secondary radiation source can be employed in this embodiment, e.g. a secondary light emitting tube, in particular a UV light emitting tube of a CsI type scintillator is used. The primary radiation 6 is irradiated onto the surface of the scintillator 612 that faces substrate 621, i.e. the primary radiation 6 is irradiated from below in FIG. 9.

For guiding secondary light 22 from the LED array 620 to the detector device 610 in order to perform front illumination of the detector device 610, the radiation detector device 610 comprises a light guide 650, e.g. a light guide plate as depicted in FIG. 9, is provided which distributes the secondary light 22 from the secondary light source 620. For example, the light guide plate 650 can be designed to distribute the secondary light 22 across a surface that corresponds to the detector surface of photo detector 614 or to the scintillator surface of scintillator 612. On a surface 652 of the light guide plate 650 which is opposite the detector device 610, a reflection sheet 654 may be provided which is transparent for the primary radiation and which reflects the secondary radiation. Further, a reflector 656 for focusing the secondary light 22 into the light guide plate 650 may be provided.

A substrate 621 is provided which is formed of glass in the embodiment shown in FIG. 9. However, other materials are suitable as long as they are transparent for the primary radiation and the secondary radiation. The substrate 621 carries an optical filter 658 and a scintillator 612, for example a CsI scintillator layer. On top of the scintillator 612, opposite to the substrate 621, the CMOS type photo detector 614 is positioned. The photo detector 614 may be provided in the form of a wafer having a plurality of photo detectors. The wafer may be formed of silicon or any other suitable material. Instead of the described CMOS type radiation detector 614, any other radiation detector may be used. The optical filter is a low pass filter that passes the secondary radiation and the primary radiation and which reflects scintillator emission light. In this way, the responsitivity of the scintillator 612 for primary radiation generated photons is increased.

In order to direct the secondary light to the scintillator 612, a radiation director 660, e.g. a face down prism sheet as shown in FIG. 9, can be provided. In the depicted embodiment, the director 660 directs the secondary radiation 22 essentially perpendicular to the scintillator surface. To further homogenize the secondary radiation 22, a diffuser sheet can be provided. For example, an appropriately designed substrate 621 can act as diffuser sheet.

In the embodiment of FIG. 6, the secondary radiation source 620, and the elements in the radiation path of the secondary radiation between the secondary radiation source and the substrate, e.g. the light guide 650 and the director 660, can be replaced by a photo-luminescence sheet. Further, the photo detector 314 in the embodiment shown in FIG. 5 can be a CMOS type photo detector as the photo detector 614 of the embodiment shown in FIG. 9.

While the invention has been illustrated and described in detail in the drawings and foregoing description, such illustration and description are to be considered illustrative or exemplary and not restrictive; the invention is not limited to the disclose embodiments.

For example, the invention is not limited to an X-ray-detector device or to the calibration of an X-ray detector device. Rather, it is possible to use the irradiation of the scintillator with the secondary radiation in any application which requires a uniform spatial gain distribution of a scintillator for a primary radiation.

Other variations to the discussed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does no indicate that a combination of these measures cannot be used to advantage. A computer program may be stored/distributed on a suitable medium supplied together with or as part of other hardware, but may also be distributed in other forms, such as via the Internet or other wired or wireless telecommunication systems. Any reference signs in the claims should not be construed as limiting the scope.

The invention claimed is:

1. A detector device for detecting a primary radiation from a primary radiation source, the device comprising:
   a substrate having a first surface and a second surface;
   a scintillator configured to generate a converted primary radiation in response to incoming primary radiation;
   a photo detector configured to detect said converted primary radiation;
   a secondary radiation source configured to irradiate said scintillator with a secondary radiation to thereby produce a spatially more uniform response of the scintillator to said incoming primary radiation; said secondary radiation having a wavelength different from a wavelength of said incoming primary radiation; and
   a tertiary radiation source having a plurality of tertiary light emitting diodes located on the second surface of the substrate and configured to irradiate the scintillator with tertiary radiation which is different from the secondary radiation,
   wherein the photo detector is located on the first surface of the substrate and the secondary radiation source is located on the second surface of the substrate, and wherein the first surface of the substrate faces towards the scintillator and the second surface of the substrate faces away from the scintillator.

2. The detector device according to claim 1, wherein said secondary radiation has a wavelength from 350 nm to 450 nm.

3. The detector device according to claim 1, wherein said secondary radiation source comprises at least one light emitting diode configured to emit the secondary radiation though the photo detector towards the scintillator, the photo detector being transparent to the secondary radiation.

4. The device according to claim 1, further comprising a control unit configured to operate said secondary radiation source in response to a non-activation signal indicating at least one of absence of said incoming primary radiation and absence of a detector read-out.

5. The detector device according to claim 1, wherein said secondary radiation source comprises at least one photo-luminescent sheet.

6. The detector device according to claim 5, wherein said photo-luminescent sheet may comprise an organic luminescence layer of an organic light emitting diode (OLED).

7. The detector device of claim 1, wherein the secondary radiation source comprises secondary light emitting diodes that alternate with the tertiary light emitting diodes.

8. An imaging apparatus comprising:
   a detector device; and
   a primary radiation source configured to generate incoming primary radiation,
   wherein the detector device comprises:
   a substrate having a first surface and a second surface;
   a scintillator configured to generate a converted primary radiation in response to incoming primary radiation;
   a photo detector configured to detect said converted primary radiation;
   a secondary radiation source for irradiating said scintillator with a secondary radiation to thereby produce a spatially more uniform response of the scintillator to said incoming primary radiation; said secondary radiation having a wavelength different from a wavelength of said incoming primary radiation; and a tertiary radiation source having a plurality of tertiary light emitting diodes located on the second surface of the substrate and configured to irradiate the scintillator with tertiary radiation which is different from the secondary radiation, wherein the photo detector is located on the first surface of the substrate and the secondary radiation source is located on the second surface of the substrate, and wherein the first surface of the substrate faces towards the scintillator and the second surface of the substrate faces away from the scintillator.

9. The imaging apparatus according to claim 8, further comprising:
a control unit configured to activate said secondary radiation source in response to a non-activation signal indicating that an imaging process is not being performed.

10. The Imaging apparatus according to claim 8, further comprising:
a control unit, said control unit being configured to:
command an acquisition of an image sequence by respectively activating an imaging process involving primary radiation at least twice with a pause between two activations of said imaging process; and
operate said secondary radiation source in said pause where said imaging process is not activated.

11. A detector device for detecting a primary radiation, the device comprising:
a substrate having a first surface and a second surface, the first and second surfaces being opposite each other;
a scintillator configured to generate a converted primary radiation in response to incoming primary radiation;
a plurality of photo detectors configured to detect said converted primary radiation;
a secondary radiation source configured to irradiate said scintillator with a secondary radiation to thereby produce a spatially more uniform response of the scintillator to said incoming primary radiation;
said secondary radiation having a wavelength different from a wavelength of said incoming primary radiation,
wherein the photo detector is located on the first surface of the substrate and the secondary radiation source is located on the second surface of the substrate, and
wherein the secondary radiation source comprises a plurality of light emitting diodes located on the second surface of the substrate across from spaces between the plurality of photo detectors for emitting the secondary radiation though the spaces towards the scintillator, the photo detector being non-transparent to the secondary radiation.

12. A detector device for detecting a primary radiation, the device comprising:
a substrate having a first surface and a second surface, the first and second surfaces being opposite each other;
a scintillator configured to generate a converted primary radiation in response to Incoming primary radiation;
a photo detector configured to detect said converted primary radiation;
a secondary radiation source configured to irradiate said scintillator with a secondary radiation to thereby produce a spatially more uniform response of the scintillator to said Incoming primary radiation;

said secondary radiation having a wavelength different from a wavelength of said incoming primary radiation; and a tertiary radiation source located on the second surface of the substrate configured to irradiate the scintillator with tertiary radiation which is different from the secondary radiation, wherein the photo detector is located on the first surface of the substrate and the secondary radiation source is located on the second surface of the substrate.

13. The detector device of claim 12, wherein the secondary radiation is UV light and the tertiary radiation is red light.

14. A method of operating a detector device for detecting a primary radiation from a primary source by a plurality of photo detectors located on a first surface of a substrate, the method comprising acts of:
providing a secondary radiation source configured to provide a secondary radiation having a wavelength different from a wavelength of said primary radiation; and
irradiating a scintillator with the secondary radiation to produce a spatially more uniform response of the scintillator to said primary radiation, wherein the secondary radiation source is located on a second surface of the substrate, the second surface being opposite the first surface where the photo detector is located,
wherein the secondary radiation source comprises a plurality of light emitting diodes located on the second surface of the substrate across from spaces between the plurality of photo detectors for emitting the secondary radiation though the spaces towards the scintillator, the photo detector being non-transparent to the secondary radiation.

15. The method of claim 14,
further comprising an act of generating control signals by a controller to command an activation of the secondary radiation source.

16. A method of operating a detector device for detecting a primary radiation from a primary source by a photo detector located on a first surface of a substrate, the method comprising acts of:
providing a secondary radiation source configured to provide a secondary radiation having a wavelength different from a wavelength of said primary radiation, the secondary radiation source being located on the second surface of the substrate;
irradiating a scintillator with the secondary radiation to produce a spatially more uniform response of the scintillator to said primary radiation, wherein the secondary radiation source is located on the second surface of the substrate, the second surface being opposite the first surface where the photo detector is located; and
irradiating the scintillator with a tertiary radiation from a tertiary source located on the second surface of the substrate, wherein the tertiary radiation is different from the secondary radiation.

17. The method of claim 16, wherein the secondary radiation is UV light and the tertiary radiation is red light.

18. The method of claim 16, wherein the secondary radiation source comprises secondary light emitting diodes that alternate with tertiary light emitting diodes of the tertiary source.

* * * * *